UNITED STATES PATENT OFFICE.

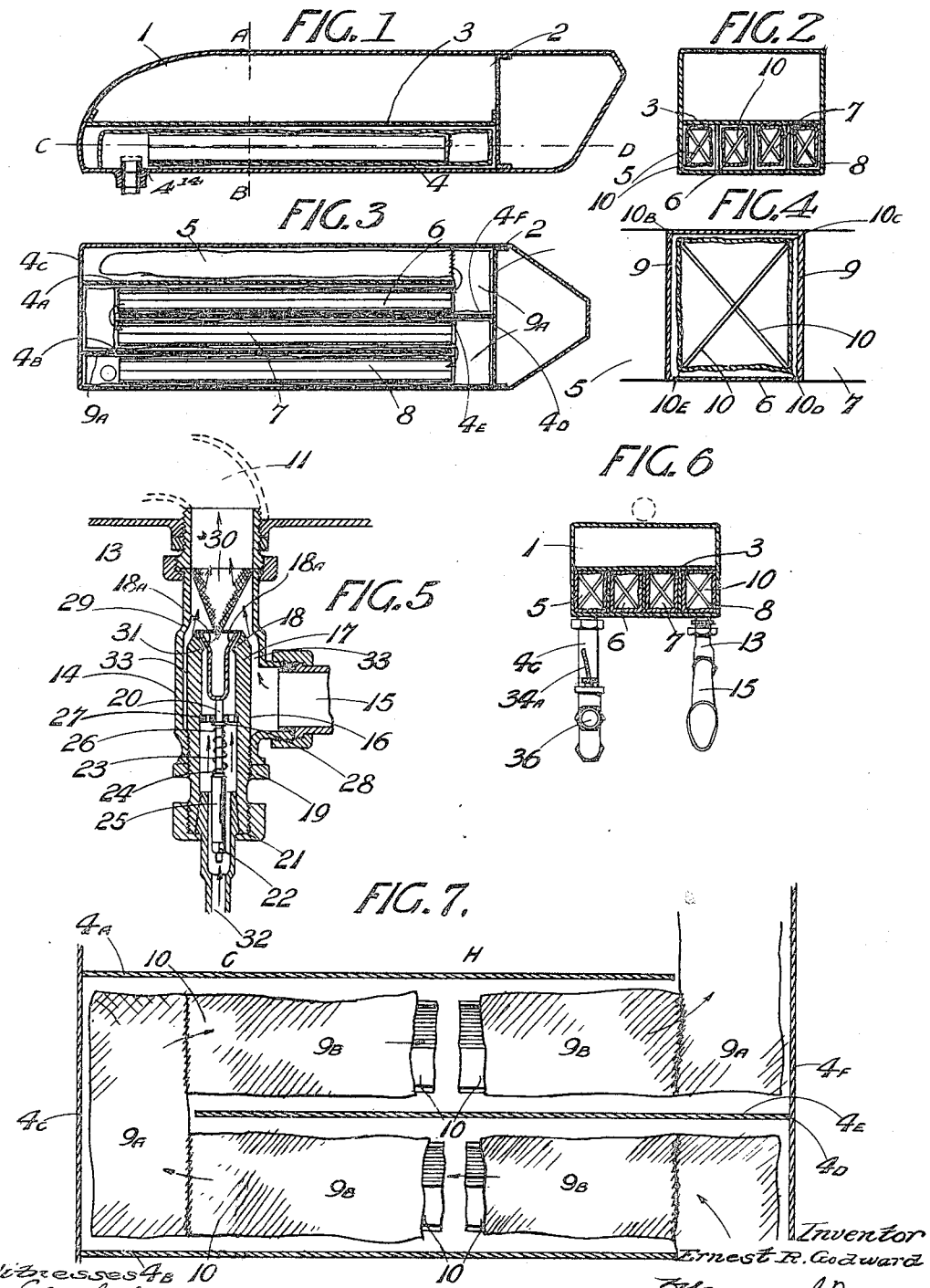

ERNEST ROBERT GODWARD, OF DUNEDIN, NEW ZEALAND.

GASEOUS-FUEL MIXER.

1,182,762. Specification of Letters Patent. Patented May 9, 1916.

Application filed December 19, 1913. Serial No. 807,782.

*To all whom it may concern:*

Be it known that I, ERNEST ROBERT GODWARD, a subject of King George V of Great Britain, residing at No. 40 Dowling street, Dunedin, in the Dominion of New Zealand, have invented certain new and useful Improvements in Gaseous-Fuel Mixers, of which the following is a specification.

This invention relates to improvements in gaseous fuel mixers adapted for the production of fuel for internal combustion engines.

In carbureters of the type most frequently used, the liquid fuel was introduced into the combustion chamber from a point in close proximity thereto and in quantities in excess of that required to carburet the air with the result that a certain amount of raw fuel passed through the combustion chamber without utilization and was consequently wasted.

It is the object of the present invention to provide improved apparatus whereby this disadvantage is overcome, the liquid fuel being atomized and mixed with air, and the mixed air and atomized fuel being then passed through a substantial length of absorbent material having angular or return bends whereby the liquid fuel which is not absorbed by the air is collected by the absorbent material and is retained thereby until sufficient air passes through the absorbent material to absorb the excess fuel. In this way the lighter and more volatile hydrocarbons are held in suspension by the air assisted by the partial vacuum resulting from the suction stroke of the engine, while the heavier and less volatile hydrocarbons are caught by angular or return bends of the absorbent material and gradually supplied to the air passing through the apparatus. The results are that a more perfect and uniformly carbureted air is supplied which may be used advantageously for internal combustion engines, illuminating and other purposes, and waste of fuel is avoided.

To these and other ends, the invention consists in certain improvements, and combinations and arrangements of parts, all as will be hereinafter more fully described, the novel features being pointed out particularly in the claims at the end of the specification.

In the drawings:—Figure 1 is a sectional elevation of a gaseous fuel mixer constructed in accordance with one embodiment of the invention. Fig. 2 represents a cross-section on the line A—B, Fig. 1. Fig. 3 represents a horizontal section on the line C—D, Fig. 1. Fig. 4 is an enlarged sectional view of one of the generator tubes. Fig. 5 is a sectional view of an atomizer for supplying atomized fuel to the mixer. Fig. 6 represents a cross-section through the mixer showing the inlet and outlet connections therefor. Fig. 7 is a detail view, on an enlarged scale, showing one of the fabric lined conduits.

A petrol tank (1) of ordinary design is used having the usual vertical partition (2) dividing the lubricating oil and the petrol, a horizontal division (3) forms the bottom of the petrol tank, and a cover for the generator compartment (4). The compartment (4) is divided longitudinally, preferably with metal partitions a little shorter than the length of the compartment; one end of each alternate partition ($4^A$) and ($4^B$) is attached to one end ($4^C$) of the compartment, and one end ($4^D$) of the intermediate partition ($4^E$) is attached to the opposite end ($4^F$) of the compartment. The spaces between the said partitions are hereinafter termed "conduits." The generator comprises a series of these conduits inserted in the compartment (4) placed side by side; four of the said conduits are shown in Fig. 4 numbered (5), (6), (7), and (8). Provision is made to line the conduits with fabric, indicated at (9), hereinafter called the stocking. The stocking is held expanded in contact with the interior surface of the conduits by any suitable means. One method shown consists of a bar (10) resembling in section the letter X, one length thereof being used for each conduit in the generator as indicated in Figs. 4, 6, and 9. The X shaped bars are inserted within the stocking thus keeping the corners ($10^B$), ($10^C$), ($10^D$), and ($10^E$) in contact with the stocking and retaining it in a semi-stretched condition against the interior surface of the metal conduits.

A method of constructing the stocking is shown in Fig. 9, (the view being broken at (H) to show the X shaped bars (10)), two fabric lined conduits being placed side by side; (9ᴬ) represents a portion of the stocking (9) joining the two fabric lined conduits together, three of these portions (9ᴬ) would be required when there are four fabric lined conduits as illustrated in Fig. 5. The portions (9ᴬ) may have short X shaped sections to maintain them normally stretched if desired. The inlet to the stocking is indicated at (11) Fig. 7, the section thereof developing from a square to a circular shape at the inlet (11) to enable a handy coupling being made with the atomizer (13).

The atomizer comprises a vertical tubular casing (14) having air inlet (15) in its side. There is a hollow metal piece (16) extending upward for a short distance beyond the air inlet (15) having its upper end (17) machined to form a seat (18) for a petrol inlet valve (18ᴬ); the said piece (16) is screw threaded, adapted to screw upward through the bottom of the said casing (14) for adjustment, and is secured in position by a lock nut (19). The petrol inlet valve (18ᴬ) is in the form of an elongated cup resting on the before mentioned seat. The stem (20) of the valve (18ᴬ) hangs in a vertical position within the hollow metal piece (16), extends for a short distance beyond the lower end (21) thereof, and is fitted with an adjusting nipple (22). Surrounding the valve stem (20) is a fine coil spring (23) retained in compression; the lower end (24) of this spring (23) engages with a distance piece (25) on the valve stem (20), the upper end (26) of the spring engaging with a perforated washer (27) fixed within the said hollow metal piece (16) thus keeping the petrol inlet valve (18ᴬ) normally on its seat. A collar (28) forming a shoulder may be attached to the valve stem (20) limiting the lift of the petrol inlet valve (18ᴬ). The tubular casing (14) forms an annular space around the hollow metal piece (16) and is contracted in diameter at (29) approximately in line with the valve seat (18) forming a ring shaped opening around the valve seat mainly for the purpose of directing the air across the said opening. At the upper end of the tubular casing (14) an inverted gauze cone (30) is fixed having its point (31) directly over the elongated cup. The atomizer may be fixed by a union screw and nipple as shown in Fig. 5 securing it to a fitting on the bottom of the generator (4).

When the piston of the engine descends in its induction stroke, petrol is sucked through the petrol pipe (32) up through the hollow metal piece (16); the petrol inlet valve (18ᴬ) is lifted against the influence of the helical spring (23) and petrol is sprayed in a thin film around said valve. Simultaneously with this operation a supply of air is drawn through the air inlet (15) up through the annular space (33) meeting the petrol and forming a mixture therewith. The strength of the mixture is adjusted by screwing the hollow metal piece (16) up or down to increase or decrease the air opening (33) and by enlarging or reducing the valve lift through the medium of the nipple (22) to increase or decrease the flow of petrol. The mixture is then sucked through the gauze cone (30), through the gas generator (4) and thence to the engine.

Should by any mischance an excess of petrol pass through the valve (18ᴬ), it collects on the gauze cone (30) and trickles down into the valve cup; the weight of the petrol acting against the influence of the spring (23) reduces the opening between the valve (18ᴬ) and the valve seat (18) automatically reducing the supply of petrol from the tank until the overflow of petrol on the cup part of the valve is absorbed. The mesh and area of the gauze cone (30) are made large enough to take the largest volume of mixture capable of being admitted through the valve opening. Further precautions are taken in the event of an excess of petrol lodging in the generator. The outlet pipe (4ᴳ) is projected up into the generator as indicated in Fig. 1, and a suitable gauze cap (4ᴴ) is placed over the outlet. A suitable throttle is fitted between the generator, the outlet 4ᴳ, and the inlet 36 leading to the cylinder of the engine for producing the proper mixture of gas and air and for controlling the supply of this mixture to the engine, the throttle being controlled, for example, in the ordinary way by a Bowden wire 34ᵃ, which is partially shown in Fig. 6.

What I claim as new and desire to secure by Letters Patent is:—

1. In a gaseous fuel mixer adapted for use in connection with a device for atomizing liquid fuel and mixing the same with air, a series of conduits connected to receive such atomized fuel and air and adapted to be connected to the intake of an internal combustion engine, said conduits being arranged side by side and connected by angular return bends, linings of fabric within said conduits, and means to stretch said linings to conform with the sectional shape of said conduits.

2. In a gaseous fuel mixer adapted for use in connection with a device for atomizing liquid fuel and mixing the same with air, a series of connected conduits to receive the atomized fuel and air from said device and adapted to be connected to the intake of an internal combustion engine, a lining of absorbent fabric contained in each conduit, and connecting pieces of fabric arranged angularly at the adjacent ends of the conduits and coupling the alternate ends of said fabric linings to form a continuous angular passage for the fuel from the inlet to the outlet.

In testimony whereof I have hereunto set my hand in presence of two subscribing witnesses.

ERNEST ROBERT GODWARD.

Witnesses:
 ROBERT WALLS,
 ROBERT PARK, Jr.

Copies of this patent may be obtained for five cents each, by addressing the "Commissioner of Patents, Washington, D. C."